US007787905B2

(12) United States Patent
Witzel et al.

(10) Patent No.: US 7,787,905 B2
(45) Date of Patent: Aug. 31, 2010

(54) OPERATING OF A SWITCHING NODE IN A COMMUNICATIONS NETWORK COMPRISING BOTH A LAYERED AND A NON-LAYERED ARCHITECTURAL ENVIRONMENT

(75) Inventors: Andreas Witzel, Herzogenrath (DE); Jyri Andersson, Alsdorf (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 10/516,866

(22) PCT Filed: Jun. 4, 2003

(86) PCT No.: PCT/EP03/05851

§ 371 (c)(1),
(2), (4) Date: Dec. 3, 2004

(87) PCT Pub. No.: WO03/103310

PCT Pub. Date: Dec. 11, 2003

(65) Prior Publication Data
US 2005/0192004 A1 Sep. 1, 2005

(30) Foreign Application Priority Data
Jun. 4, 2002 (EP) .................................. 02012262

(51) Int. Cl.
*H04B 1/38* (2006.01)
(52) U.S. Cl. .................. 455/560; 455/78; 455/445; 370/353; 370/352; 370/360
(58) Field of Classification Search ................ 455/445, 455/78, 560; 370/352, 354, 353, 360
See application file for complete search history.

(56) References Cited

U.S. PATENT DOCUMENTS 6,765,890 B1 * 7/2004 Palat et al. .................. 370/331

(Continued)

FOREIGN PATENT DOCUMENTS

EP 1 182 900 A 2/2002

(Continued)

OTHER PUBLICATIONS

"Digital cellular telecommunications system (Phase 2+) (GSM);Universal Mobile Telecommuncations System (UMTS);Network aerchitecture (3GPP TS 23.002 version 4.3.0 Release 4)" ETSI TS 123 002 V4.3.0, XX, XX Jun. 2001 92001-06), pp. 1-42, XP002200605 figure 1.

*Primary Examiner*—Charles N Appiah
*Assistant Examiner*—Kwasi Karikari (57) ABSTRACT

The invention relates to a method for operating a switching node of a communications network, wherein the communications network comprises a layered architectural environment and a non-layered architectural environment. The switching node provides processing capabilities for the processing of communications services both within the layered and the non-layered architectural environment The method comprises the steps of receiving a communication service request, determining according to at least one predetermined rule as an operation mode, whether the switching node is going to act for a processing of the requested communication service as a switching node of the layered architectural environment or as a switching node of the non-layered architectural environment, and processing the requested communications service in accordance with the determined operation mode of the switching node. The invention relates further to a corresponding network node, communications system and computer program.

18 Claims, 5 Drawing Sheets

U.S. PATENT DOCUMENTS

| | | | |
|---|---|---|---|
| 6,795,708 B1 * | 9/2004 | Patel | 455/450 |
| 2001/0031635 A1 * | 10/2001 | Bharatia | 455/432 |
| 2002/0087674 A1 * | 7/2002 | Guilford et al. | 709/223 |
| 2003/0027569 A1 * | 2/2003 | Ejzak | 455/432 |
| 2003/0114158 A1 * | 6/2003 | Soderbacka et al. | 455/436 |
| 2003/0157935 A1 * | 8/2003 | Kauhanen | 455/436 |
| 2004/0077345 A1 * | 4/2004 | Turner et al. | 455/423 |
| 2004/0102199 A1 * | 5/2004 | Haumont | 455/458 |

FOREIGN PATENT DOCUMENTS

| | | |
|---|---|---|
| WO | WO 01 13657 A | 2/2001 |
| WO | WO 01 15475 A | 3/2001 |

* cited by examiner

OPERATING OF A SWITCHING NODE IN A COMMUNICATIONS NETWORK COMPRISING BOTH A LAYERED AND A NON-LAYERED ARCHITECTURAL ENVIRONMENT

The invention addresses the field of communication networks. It relates to a method and computer program for operating a switching node in a communications network comprising both a layered architectural environment and a non-layered architectural environment. It relates furthermore to a corresponding network node.

TECHNOLOGICAL BACKGROUND OF THE INVENTION

The monolithic network architecture of 2nd generation mobile communications networks (so-called 2G systems) is well known. E.g., the non-layered architecture for a Group Special Mobile GSM circuit switched core network comprises a Mobile Switching Centre MSC/VLR that is connected via the so-called A-interface to the radio access network and via the so-called Lg interface to the further core network of the communications system. The MSC/VLR performs switching tasks in the 2G network. To do so, it processes user data and signalling data, both of which are exchanged with the radio access network by means of the so-called A-interface.

A layered network architecture has been developed for 3rd generation mobile communications systems (so-called 3G systems), e.g. used for the wideband code divisional multiple access WCDMA based Universal Mobile Telecommunications Systems UMTS. The split architecture provides a control plane for the handling of signalling data and a separate user plane for the: handling of user data. Consequently, the MSC/VLR node is being replaced in the split architecture by a MSC-Server in the control plane and a Media-Gateway MGW in the user plane. The MSC-Server processes signalling data related to switching tasks, while the Media-Gateway processes user data related switching tasks. WO 01/13657 A1 refers to an implementation of call setup procedures with separation of call control and bearer control.

Architectural details can be found in the following specifications issued by the 3GPP organisation: 3GPP 23.002 version 5.6 *Network Architecture*, in particular chapter 4.1.2; and 3GPP 23.205 version 5.1 *Bearer-independent circuit-switched core network*, in particular in chapter 5.1 for the logical architecture.

In order to provide subscribers with the enhanced services of UMTS, network operators will migrate their networks during a transition period of some years towards the split architecture. However, a lot of operators have certain spare capacity within their GSM networks, and would like to use it to handle WCDMA traffic instead of buying new MSC-Server nodes. In order to achieve this, the operator would need to configure the existing MSC nodes as MSC servers and then move all the existing GSM traffic to remote MGWs. However, this drastic migration would disrupt the existing GSM traffic.

Therefore, it is an object of the invention to provide an improved switching node of a communications system and an improved method to control the operation of a switching node of a communications system, which allow for a smooth migration from non-split to split architecture and at the same time allow for minimizing the investments into physical equipments.

SUMMARY OF THE INVENTION

This object is solved by the teaching of the independent claims.

The invention provides a method for operating a switching node of a communications network. The communications network comprises a layered architectural environment, in which a user plane layer is provided for user data and a control plane layer is provided for signalling data. Furthermore, there is a non-layered architectural environment, which does not provide a split between the user plane and the control plane. The switching node provides processing capabilities for the processing of communications services both within the layered and the non-layered architectural environment. The communications system comprises an access network serving at least one subscriber terminal. The method comprises the steps of receiving a communication service request, determining according to at least one predetermined rule as an operation mode, whether the switching node is going to act for a processing of the requested communication service as a switching node of the layered architectural environment or as a switching node of the non-layered architectural environment, and processing the requested communications service in accordance with the determined operation mode of the switching node.

It should be noted that a switching note in the sense of the invention can be any node or server node for switching functions.

In a further aspect, the invention provides a network node, in particular a combined MSC/VLR and MSC-Server, of a communications network, wherein the communications network comprises a layered architectural environment, in which a user plane layer is provided for user data and a control plane layer is provided for signalling data, and a non-layered architectural environment, which does not provide a split between the user plane and the control plane, said switching node comprising an access network interface for the user plane, an access network interface for the control plane, a core network interface for the user plane, a core network interface for the control plane, a media gateway interface, a media gateway operation unit connected to the user plane interfaces adapted to provide media gateway functions, a MSC-Server operation unit connected to the control plane interfaces and the media gateway interface adapted to provide MSC-server functionality, a selection unit adapted to determine for a communication service request received via any control plane interface according to at least one predetermined rule as an operation mode, whether the switching node is going to act for a processing of the requested communication service as a switching node of the layered architectural environment or as a switching node of the non-layered architectural environment, and a processor connected to the interfaces and units of the switching node, said processor being adapted to process a requested communications service in accordance with a determined operation mode of the switching node.

Advantageously, the capability of the switching node to act on a per communications service base, e.g. on a per call base, either as a MSC/VLR or as a MSC-Server leads to an optimised equipment reuse when migrating a network from a non-split architecture to a split architecture. Furthermore, it allows for an operator to control by appropriate configurations of the rules, upon which the acting role of the switching node is determined, a balanced traffic distribution between non-split and split architecture. Additionally, hardware investments inside the switching node are minimized. It is a further advantage that the invention removes the need for a user plane connection between the MSC and the MGW in a certain migration scenario. Furthermore, the invention can be implemented in a simple way. Its low complex design leads to a high quality standard while the testing and maintenance effort is kept low.

Advantageous embodiments of the invention are emphasized in the dependent claims.

In one embodiment of the invention is the communications service request a call set-up request.

In a further embodiment is the at least one predetermined rule configured according to the available network capabilities. Advantageously, this allows an operator: to adapt the switching network to individual demands of the network, both in a static and a dynamic way, i.e. during regular operations as well as during maintenance periods. The provided scalability allows for an operator to adapt any network changes—manually or automatically—in a flexible and efficient way.

In another embodiment is a plurality of incoming routes from the access network to the switching node provided. At least one predetermined rule comprises an assignment of a dedicated incoming route to an operation mode of the switching node. The communication service request originates from the subscriber terminal, and the step of determining the operation mode comprises the determination of the incoming route of the communication service request and a comparison of the determined incoming route against the predetermined rules.

In a further embodiment provides the communications system access to subscribers by means of at least two different access technologies, e.g. by means of GSM and UMTS. At least one predetermined rule comprises an assignment of a dedicated access technology to an operation mode. The communication service request originates from a subscriber terminal, and the step of determining the operation mode comprises the determination of the access technology used by the subscriber terminal and a comparison of the determined access technology against the predetermined rules.

In another embodiment originates the communication service request from a subscriber terminal and comprises an identifier of a communications service terminating party, e.g. a phone number of the party. At least one predetermined rule comprises an assignment of the identifier to a dedicated operation mode, and the step of determining the operation mode comprises the determination of the identifier and a comparison of the determined identifier against the predetermined rules.

In a further embodiment indicates at least one predetermined rule by means of a statistical distribution factor a distribution, for how many received communications service requests the switching node shall act as a switching node of the layered architectural environment or as a switching node of the non-layered architectural environment. This allows an operator by means of an appropriate selection of the statistical distribution factor to use the available network capacity in a most efficient way.

In another embodiment comprises the determination of the operation modes a determination of a current load level of the switching node in at least one operation mode, and the determined operation mode depends on the determined load level. This allows for adapting the operational mode of the switching node to the currently available network load.

In a further embodiment requests the communication service request a subscriber terminal terminating communications service. At least one predetermined role comprises an assignment of an access technology available to the subscriber terminal to a dedicated operation mode, and the step of determining the operation mode comprises the determination of the access technology available to the terminating subscriber terminal. The determined operation mode depends on the determined access technology.

In another embodiment processes the switching node the requested communications service in a role of a MSC/VLR, if the switching node is determined to act as a switching node of the non-layered architectural environment of the communications system.

In a further embodiment processes the switching node the requested communications service in a role of a MSC-Server, if the switching node is determined to act as a switching node of the layered architectural environment of the communications system.

In a further embodiment comprises the determination of the operation mode a determination of at least one of a group of an origin of the communications service request and a destination of the communications service request, and the determined operation mode depends on the at least one determined member of the group.

In another embodiment is the switching node determined to act as a switching node of the non-layered architectural environment of the communications system, if an origin of the communications service request, in particular an originating radio network node, is local to the switching node, and a destination indicated by the communications service request is local to the switching node.

In a further embodiment is the switching node determined to act as a switching node of the layered architectural environment of the communications system, if an origin of the communications service request, in particular an originating radio network node, is remote to the switching node, and a destination indicated by the communications service request is remote to the switching node.

In another embodiment applies the switching node local switching, if an origin of the communications service request, in particular an originating radio network node, is local to the destination indicated by the communications service request. In other words, the switching node supports local switching in particular by other nodes in order to avoid unnecessary data transmissions.

In a further embodiment is the switching node determined to act as a switching node of the layered architectural environment of the communications system, if an origin of the communications service request, in particular an originating radio network node, is remote to the switching node, and a destination indicated by the communications service request is local to the switching node.

In another embodiment is the switching node determined to act as a switching node of the layered architectural environment of the communications system, if an origin of the communications service request, in particular an originating radio network node, is local to the switching node, and a destination indicated by the communications service request is remote to the switching node.

In another embodiment refers the invention to a network node, in particular a combined MSC/VLR and MSC-Server, adapted to operate according to the described method.

Another embodiment refers to the network node comprising means for storing, in particular a lookup table, of network node identifiers and related indications, indicating whether the identified network nodes are local or remote to the network node.

In a further embodiment comprises a communications system a network node according to the invention.

Another embodiment of the invention refers to a communications system comprising a layered architectural environment, in which a user plane layer is provided for user data and a control plane layer is provided for signalling data, and a non-layered architectural environment, which does not provide a split between the user plane and the control plane, wherein a switching node, in particular a combined MSC/VLR-MSC Server, provides processing capabilities for the processing of communications services both within the layered and the non-layered architectural environment, and wherein at least one further network nodes served by said switching node is remote to said switching node.

Another embodiment refers to a computer program loadable into me internal memory of a digital processing unit and comprising software code portions adapted to control the steps according to the inventive method, when the computer program is executed on the digital processing unit.

In a further embodiment is the computer program stored on a computer-readable medium like a CD-ROM, a floppy disc, optical disc or hard disk. Therefore, a good physical portability of the control software is provided, i.e. upgrades can be performed in an easy way.

In the following is the invention explained in detail with reference to the figures, which show.

DETAILED DESCRIPTION OF EMBODIMENTS OF THE INVENTION

Same reference signs are used in the following for similar features in the different figures.

Figure 1:
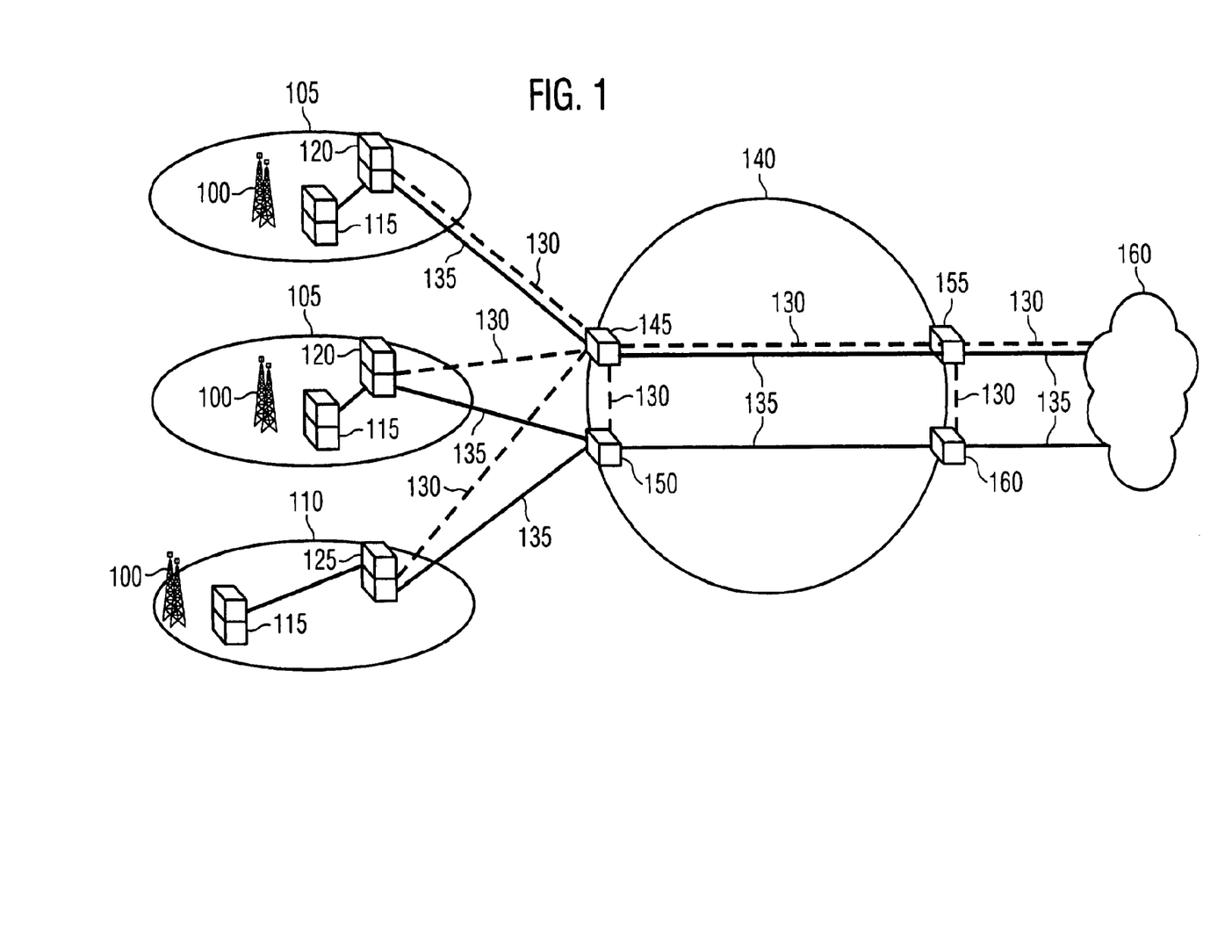
FIG. 1: a simplified network architecture that supports both layered and non-layered operation modes of network elements for switching functions.

FIG. 1 illustrates an example of a communications network that supports both layered and non-layered operation modes of network elements for switching functions. Such a network architecture is applicable for operators e.g. during a transition period from 2G systems to 3G systems. The figure shows GSM based radio access networks 105, also called Base Station System BSS. A BSS according to the simplified example comprises a Base Transceiver Station BTS 115, a Base Station Controller 120 and an antenna system 100. Furthermore, a WCDMA based radio access network 110—called UTRAN—is shown in the figure. It comprises a BTS 115 and a Radio Network Controller RNC 1.25.

The nodes 145, 150, 155, 160 of the core network are connected via a backbone 140, preferably via an Internet Protocol IP backbone. There are Media Gateways MGW 150, 160 connected via user data connections 135 to the radio access networks 105. 110, to each other and to an external PSTN/ISDN network 160. Network nodes for switching functions 145, 155 are connected both via user data connections 135 and signalling data connections 130 to each other. Whether both user data connections 135 and signalling data connections 130 are provided towards the radio access networks 105. 110, and which data connections are supported in the network in general, depends on the preference of the operator. In any case, a network node 145 connected to a radio access network needs a signalling data connection 130.

If the network node for switching functions 145, 155 has a connection for signalling data 130, and an interface towards a MGW, it can fulfill processing tasks of an MSC-Server. If the network node 145, 155 has additional user data connections 135, it can act on a per call base either as a MSC-Server or as a MSC/VLR. This operation mode does not depend on the type of the radio network 105, 110 connected to the network node. Instead, it depends just on the appropriate data connections available and the corresponding configuration of the node itself.

Therefore, a network node 145, 155 according to the invention can be operated in two modes. It can act for a processing of a requested communication service as a switching node of a layered architectural environment of the network, i.e. within a framework of split control plane and user plane, or as a network node of a non-layered architectural environment, i.e. by processing both user data and signalling data.

Figure 2:
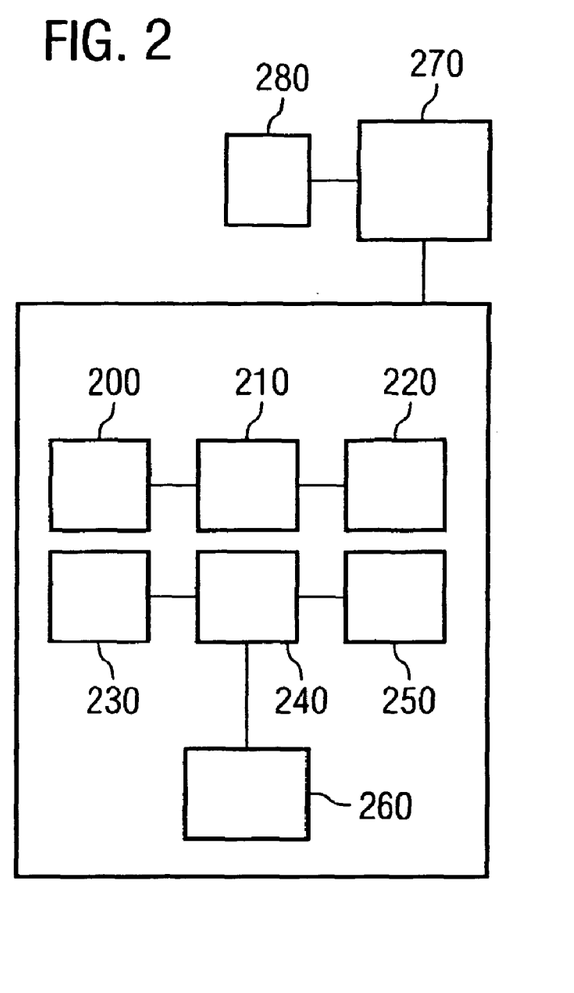
FIG. 2: in a block diagram a network element for switching functions that supports both layered and non layered operation modes.

Essential elements of such an inventive network node are illustrated in the block diagram of FIG. 2. The network node, which can be in particular a combined MSC/VLR and MSC-Server of a communications network, comprises an access network interface for the user plane 200, an access network interface for the control plane 230, a core network interface for the user plane 220, a core network interface for the control plane 250 and a media gateway interface 260. A media gateway operation unit 210 is connected to the user plane interfaces 200, 220. It provides usual media gateway functions. A MSC-Server operation unit 240 is connected to the control plane interfaces 230, 250 and to the media gateway interface 260. The MSC-Server operation unit 240 provides well-known MSC-server functionality. A selection unit 280 determines for an incoming communication service request, indicating e.g. a call set-up request message, received via a control plane interface 230, 250 an operation mode of the network element. In other words, on a per call base is determined, whether the network node acts as a MSC/VLR or as a MSC-Server. The determination of the operation mode will be explained in more detail with reference to the FIGS. 3 and 4.

However, the determination of the operation mode is performed according to predetermined rules that are stored preferably in a memory (not shown in the figure) of the selection unit 280. The rules can be configured by the operator of the network according to its individual demands and in accordance with the capabilities of the network. This means, e.g., that a configuration of the network node under certain conditions as a MSC/VLR can be valid only, if the required signalling and data connections are available fur these conditions.

Preferably, the selection unit 280 provides a configuration interface (not shown in the figure) to allow for a configuration or adaptation of the rules according to which the operation modus of the network node is determined.

The network node comprises a processor 270, which is connected to the interfaces and units of the network node preferably via a processor bus (not shown in the figure). The processor 270 takes care for the determination of the operation mode upon receipt of a communication service request, and processes the requested communications service in accordance with a determined operation mode.

Figure 3:
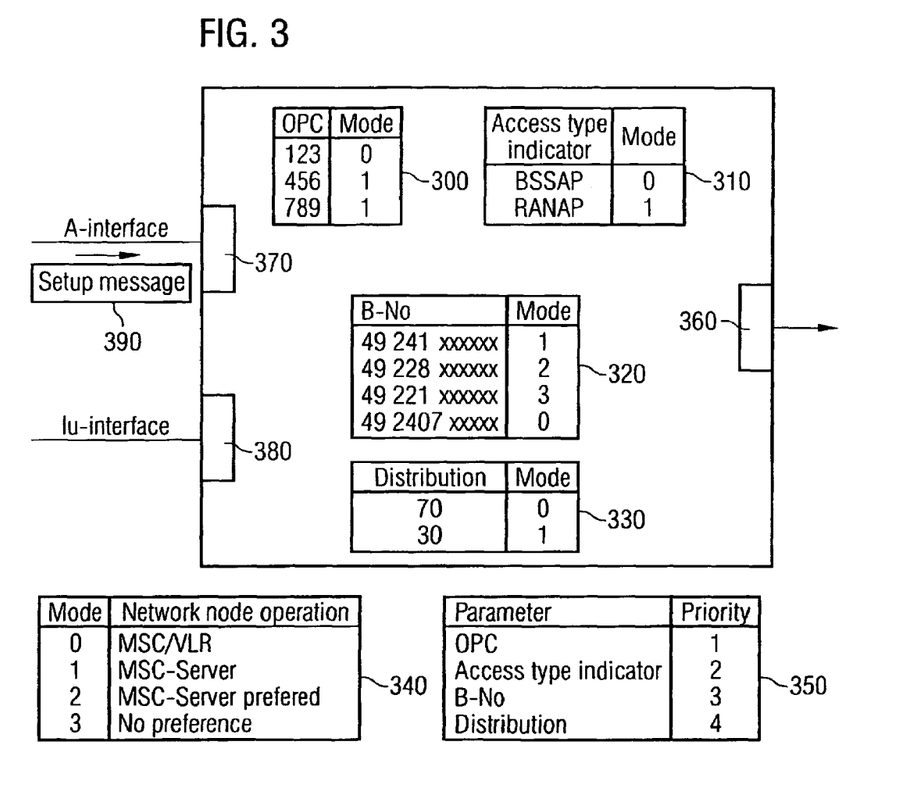
FIG. 3: a determination of the operation mode of the network element for a mobile originating communication service request.

FIG. 3 shows a mobile originating access scenario, in which a call set-up message 390 is received via a signalling interface from a radio network. The selection unit 280 determines whether the processing request is fulfilled by the network node acting as a MSC/VLR or a MSC-server depending on the incoming route from the radio access network of the request message, on the access technology used by the subscriber terminal that has originated the request, on the dialed destination, i.e. on the B-number of the called party, and on a statistical distribution factor.

The incoming route of the call-set-up request message is preferably determined by means of the Signalling System No.7 SS7, of which protocol stacks are commonly used in mobile communications systems e.g. for the transmission of call-set-up request messages. In particular, the incoming route information can be derived from the Originating Point Code OPC that is given in the Signalling Information Field SIF in the Message Transfer Part level 3 protocol layer of the SS7. Details about the well-known SS7 can be found in the ITU-T recommendations Q.701-Q.707 and ITU-T Q.2210.

An OPC configuration table 300 shows the roles for the evaluation of the OPC. E.g., if the OPC is '123', the MSC/VLR mode is determined. If OPC is '456', the MSC-Server mode is chosen.

The access type can be retrieved from the used protocol, by means of which the set-up message has been transmitted. If a BSS Application Part BSSAP has been used, MSC/VLR mode is selected. If Radio Access Network Application Part RANAP has been used, MSC-Server mode is activated. The corresponding configuration is shown in the access type indicator table 310 in FIG. 3.

The dialed destination criterion can be evaluated e.g. by means of a complete or a partial B-number analysis. The example illustrates a configuration, in which any B-number beginning with '49241' leads to the selection of MSC/VLR node, while a B-number starting with '49228' leads to the MSC-Server mode operation. '49211' just results in a preference for the MSC-Server mode, and no preference is indicated according to the configuration shown in the B-No. table 320 for the string '492407'.

E.g. for the purpose of load balancing, an operator can configure the selection unit 280 in a way that a certain percentage of all communications service requests are processed in a certain mode. The distribution table 330 indicates by means of statistical distribution factors such a configuration. For the given example, 70 percent of all communications service requests shall be processed in the MSC/VLR mode, while 30 percent shall apply to the MSC-Server mode. The selection unit therefore keeps track of the processing history of the node in order to fulfil the distribution requirement.

The different network node operation modes of the example are summarized in the mode table 340. An additional priority table indicates, which of the given configuration settings have priority in the case of any inconsistencies. E.g., if the OPC table indicates a certain operation mode, and the statistical distribution factor evaluation leads to a different mode, the OPC gains in the given example priority. It shall be noted that corresponding evaluation and priority rules can be implemented in different ways, e.g. via so-called look-up tables as shown in the example, or by an algorithm or others.

Figure 4:
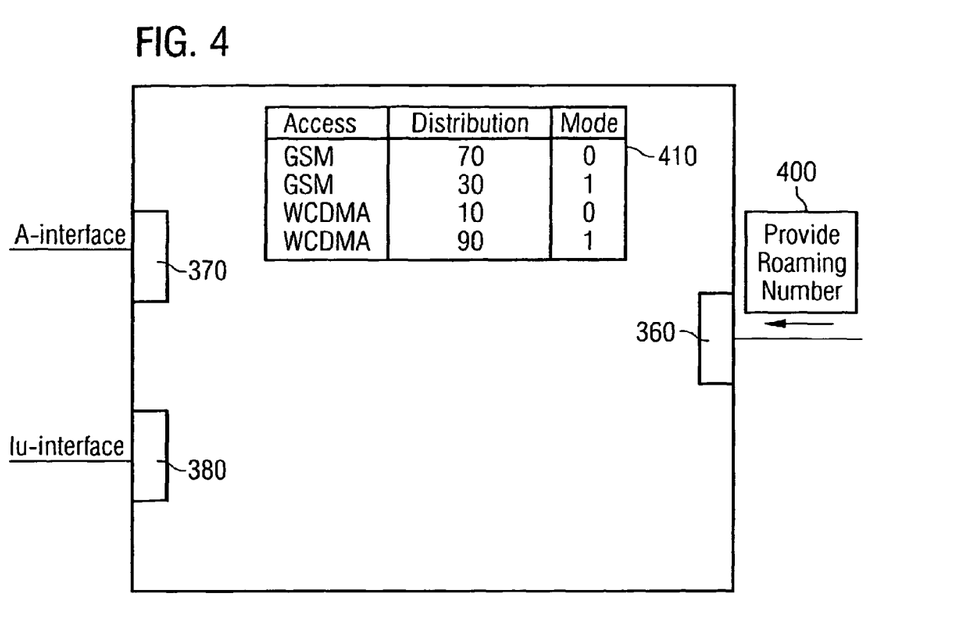
FIG. 4: a determination of the operation mode of the network element for a mobile terminating communication service request.

FIG. 4 illustrates a mobile terminating access scenario. The selection unit decides on receipt of a 'provide roaming number' Mobile Application Part MAP message 400 indicating a mobile terminating communication, which operation modus is selected. The decision is based on the access technology that the terminating subscriber terminal uses, and on a statistical distribution factor, which can be the same or different from the factors given in the mobile originating case as shown in FIG. 3.

Corresponding rules are shown in the modus table 410 of FIG. 4. In this example, all available parameters are summarized in just one table.

The decision about the operation modus can be made already at provision of the Mobile Station Roaming Number towards the Home Location Register HLR of the network. If the network node operates as a MSC/VLR, a roaming number from a pool of numbers leading to an incoming route of the MSC/VLR is used. If the MSC-Server mode is selected, a roaming number from a pool of numbers leading to a remote route on a Media Gateway is used.

It shall be noted that the described parameters and selection criterions are examples. The selection of the operation mode can in general depend on just one parameter or on a plurality of parameters in any combination on an operator's demand.

The inventive network node allows for the processing of transit calls. Therefore, the selection unit 280 selects the operation mode based on an incoming route information in a similar way as explained with reference to FIG. 3. If a call comes in on a remote MGW, also the outgoing route will be selected for a remote MGW. If the call arrives on a route to the MSC/VLR, also the outgoing route is selected to be towards an MSC/VLR.

In the case of a handover request or a SRNS relocation ensures the selection unit 280 that the call stays on the already selected MGW or MSC/VLR, provided that the necessary data connections are available. Otherwise, the handover or SRNS relocation request is preferably rejected.

A further embodiment refers to a good liability. In case a MGW fails, the operation mode selection mechanism is aborted and the non-split operation as MSC/VLR is chosen always. In other words, a fallback to the monolithic MSC/VLR mode is performed.

An alternative embodiment avoids the connection of all radio access nodes to the MSC/VLR and MGW. In other words, it is not required that all radio access nodes controlled by the switching node provide transmission connections towards the MGW and the switching node. Otherwise, full transmission connections could be costly or even not achievable in situations where the radio access node and/or the MGW are located far away from the switching node. This is typically the case in large countries or countries with an unbalanced population distribution.

Figure 5:
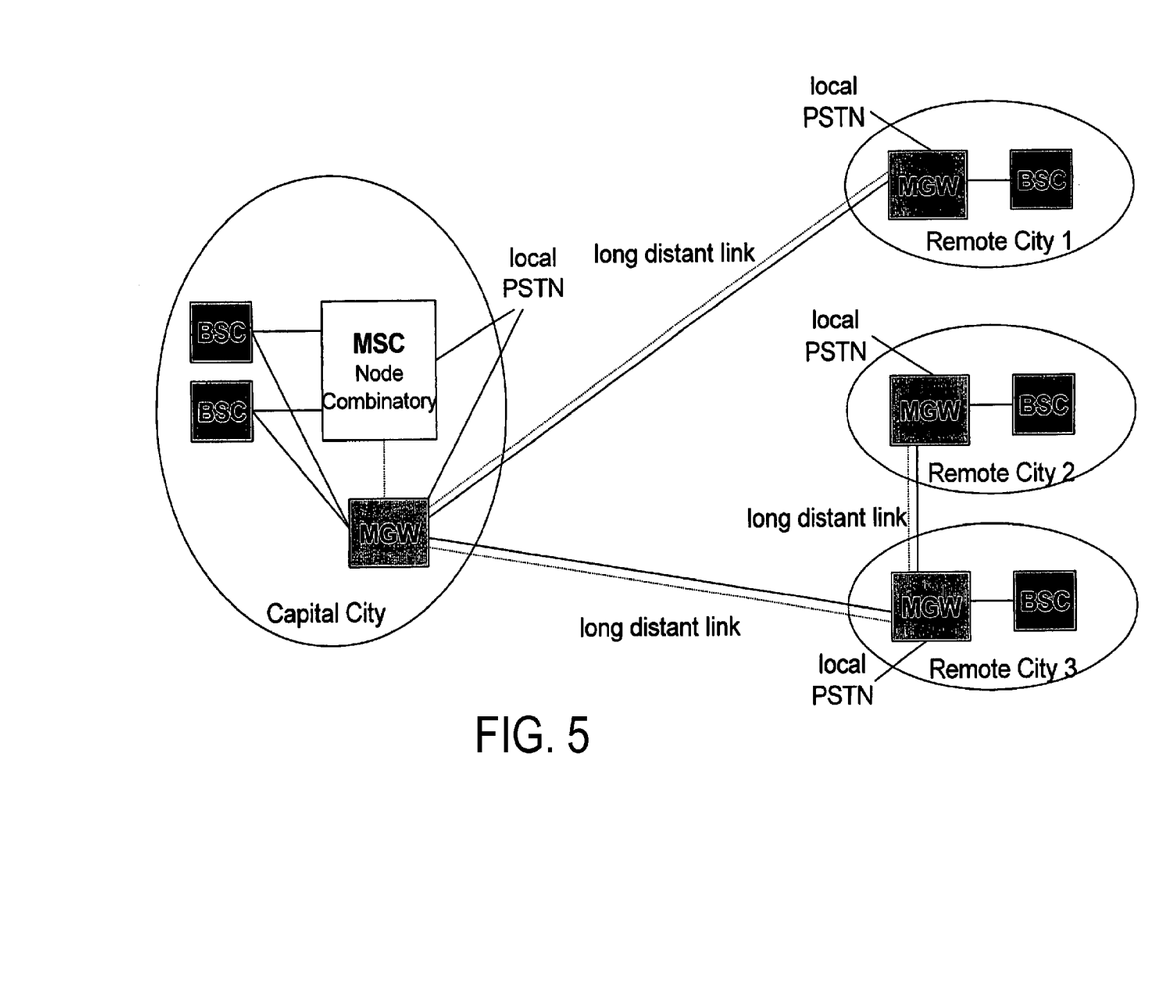
FIG. 5: a simplified communications system according to the invention.

FIG. 5 illustrates the scenario. The MSC node with the operation mode selection mechanism is located in a so-called capital city. Also located there are radio access network nodes (without being limited to, the example of FIG. 5 shows BSCs) and a MGW. In the remote cities there is just a MGW and also a radio access node. The mechanism to select the operation mode of the switching node takes into account as additional parameters the origin of the call, e.g. the originating radio access network node, and/or the destination of the call, e.g. the destinating radio access network node.

The selection mechanism performs at least one of the following: If a call originates and terminates in BSC nodes in the capital city, MSC/VLR (non-layered architecture) is chosen. If a call originates in a BSC nodes in a remote city and terminates in BSC nodes in any other remote city, MSC Server (layered architecture) is chosen. If a call originates and terminates in BSC nodes in the same remote city, MSC Server (layered architecture) is chosen and local switching is applied. If a call originates in a BSC node in any remote city and terminates in BSC nodes in the capital city, MSC Server (layered architecture) is chosen. If a call originates in a BSC node in the capital city and terminates in BSC nodes in any remote city, MSC Server (layered architecture) is chosen.

Whether a certain BSC node is located remotely or is local to the MSC Node is preferably derived from a predefined lookup table.

The invention claimed is:

1. Method for operating a switching node in a communications network, the switching node having a connection for signaling data and additional user data connections, the communications network comprising both a layered architectural environment and a non-layered architectural environment, the method comprising the steps of receiving a communication service request, determining:

by protocol of the service request, whether the switching node will operate as a layered architectural environment switching node or a non-layered architectural environment switching node, the layered architectural environment providing a user plane layer for user data and a control plane layer for signaling data and the non-layered architectural environment providing a layer for both the user plane and the control plane and the switching node being determined operatively to process the requested communication service as part of the non-layered architectural environment if an origin of the communications service request, in particular an originating radio network node, is local to the switching node, and a destination indicated by the communications service request is local to the switching node; and processing the requested communications service according to the determined operating mode of the switching node.

2. Method according to claim 1, wherein the communications service request is a call set-up request.

3. Method according to claim 1, wherein the operation mode is determined according to at least one predetermined rule, which is set-up according to available network capabilities.

4. Method according to claim 1, wherein a plurality of incoming routes from an access network to the switching node are provided, at least one predetermined rule comprises an assignment of a dedicated incoming route to an operation mode of the switching node, and wherein the step of determining the operation mode comprises a determination of an incoming route of the communication service request and a comparison of the determined incoming route against at least one predetermined rule.

5. Method according to claim 1, wherein at least one predetermined rule comprises an assignment of a dedicated access technology to an operation mode, said dedicated access technology provided by an access network for serving a subscriber terminal of a communication system comprising the switching node, and wherein the step of determining the operation mode comprises the determination of the access technology used by the subscriber terminal and a comparison of the determined access technology against at least one predetermined rule.

6. Method according to claim 1, wherein the communication service request comprises an identifier of a communications service terminating party, at least one predetermined rule comprises an assignment of the identifier to a dedicated operation mode, and wherein the step of determining the operation mode comprises a determination of the identifier and a comparison of the determined identifier against at least one predetermined rule.

7. Method according to claim 1, wherein at least one predetermined rule indicates by means of a statistical distribution factor a distribution, for how many received communications service requests the switching node shall operate as a switching node of the layered architectural environment or as a switching node of the non-layered architectural environment, and wherein the determined operation mode depends on the statistical distribution factor.

8. Method according to claim 1, wherein the determination of the operation mode comprises a current load level of the switching node in at least one operation mode, wherein the determined operation mode for the processing of the requested communications service depends on the determined load level.

9. Method according to claim 1, wherein the communication service request requests a subscriber terminal terminating communications service, wherein at least one predetermined rule comprises an assignment of an access technology available to the subscriber terminal to a dedicated operation mode, and wherein the step of determining the operation mode comprises the determination of the access technology available to the terminating subscriber terminal, and the determined operation mode depends on the determined access technology.

10. Method according to claim 1, wherein the switching node processes the requested communications service as a MSC/VLR, if the determined operation mode indicates that the switching node is part of the non-layered architectural environment.

11. Method according to claim 1, wherein the switching node processes the requested communications service as a MSC-Server, if the determined operation mode indicates that the switching node is part of the layered architectural environment.

12. Method according to claim 1, wherein the determination of the operation mode comprises a determination of at least one of a group of an origin of the communications service request and a destination of the communications service request, and wherein the determined operation mode depends on the at least one determined member of the group.

13. Method according to claim 1, wherein the switching node is determined operatively to process the requested communication service as part of the layered architectural environment, if an origin of the communications service request, in particular an originating radio network node, is remote to the switching node, and a destination indicated by the communications service request is remote to the switching node.

14. Method according to claim 13, wherein the switching node applies local switching, if an origin of the communications service request, in particular an originating radio network node, is local to the destination indicated by the communications service request.

15. Method according to claim 1, wherein the switching node is determined operatively to process the requested communication service as part of the layered architectural environment, if an origin of the communications service request, in particular an originating radio network node, is remote to the switching node, and a destination indicated by the communications service request is local to the switching node.

16. Method according to claim 1, wherein the switching node is determined operatively to process the requested communication service as part of the layered architectural environment, if an origin of the communications service request, in particular an originating radio network node, is local to the switching node, and a destination indicated by the communications service request is remote to the switching node.

17. Network node, in particular a combined MSC/VLR and MSC-Server, comprising an access network interface for the user plane, an access network interface for the control plane, a core network interface for the user plane, a core network interface for the control plane, a media gateway interface, a media gateway operation unit connected to the user plane interfaces adapted to provide media gateway functions, a MSC-Server operation unit connected to the control plane interfaces and to the media gateway interface, the MSC-Server operation unit adapted to provide MSC-server functionality, and a selection unit adapted to determine, for a communication service request received via any control plane interface, according to at least one predetermined rule;

an operation mode for a processing of the requested communication service, wherein the determined operation mode indicates whether the network node is operatively for the processing of the requested communication service part of a layered architectural environment providing a user plane layer for user data and a control plane layer for signaling data, or operatively part of a non-layered architectural environment not providing a split between a user plane and a control plane and a processor connected to the interfaces and units of the switching node, said processor being adapted to process a requested communications service in accordance with a determined operation mode of the network node, and the switching node being determined operatively to process the requested communication service as part of the non-layered architectural environment if an origin of the communications service request, in particular an originating radio network node, is local to the switching node, and a destination indicated by the communications service request is local to the switching node.

18. Network node according to claim 17, comprising means for storing, in particular a lookup table, network node identifiers and related indications, indicating whether the identified network nodes are local or remote to the network node.

* * * * *